(No Model.)
C. H. BRAITHWAITE, G. LANE & W. HERRING.
POLE FOR LAWN TENNIS NETS.
No. 349,686. Patented Sept. 28, 1886.
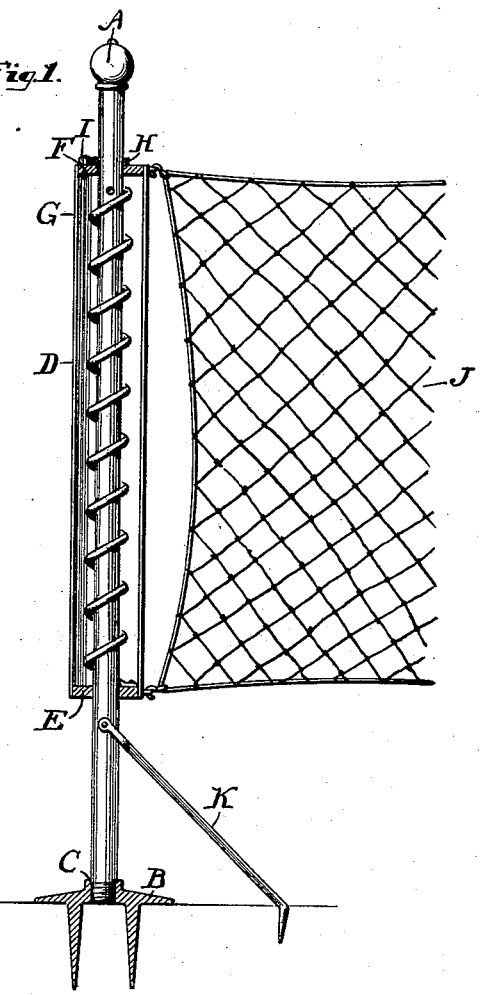
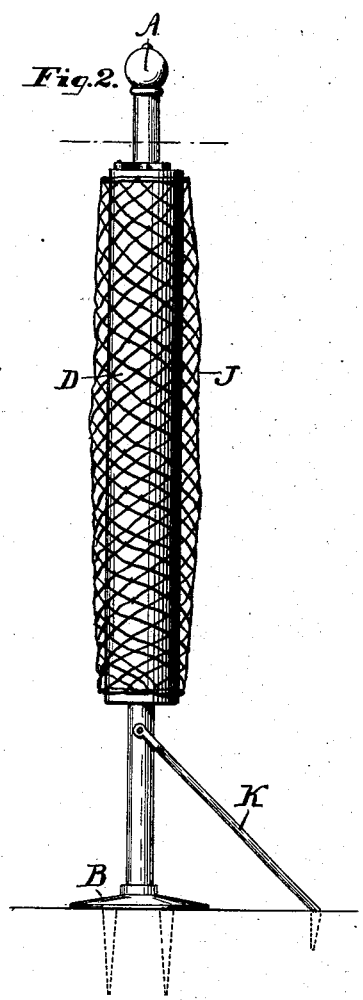
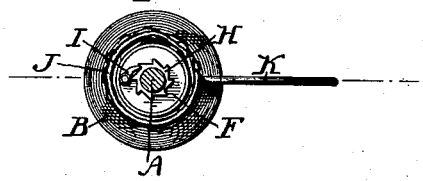

UNITED STATES PATENT OFFICE.

CHARLES H. BRAITHWAITE, OF ARDMORE, AND GEORGE LANE, OF PHILADELPHIA, PA., AND WILLIAM HERRING, OF STATEN ISLAND, N. Y.

POLE FOR LAWN-TENNIS NETS.

SPECIFICATION forming part of Letters Patent No. 349,686, dated September 28, 1886.

Application filed December 22, 1885. Serial No. 186,431. (No model.)

*To all whom it may concern:*

Be it known that we, CHARLES H. BRAITHWAITE, of Ardmore, in the State of Pennsylvania, GEORGE LANE, of Philadelphia, in the said State, and WILLIAM HERRING, of Staten Island, in the State of New York, have invented certain new and useful Improvements in Poles for Lawn-Tennis Nets.

The following is a specification of our said improvements, reference being had to the accompanying drawings, wherein—

Figure 1 shows a vertical central section through the post; Fig. 2, a side elevation of the post with the net wound thereon; and Fig. 3, a top view of the revolving reel, which constitutes a feature of our invention.

The purpose of our improvement is to supply a self-acting means for holding the net properly in position when in use and for readily rolling it up when desired, the same mechanism attaining both of these ends.

In the drawings, A represents the upright of the post, which preferably consists of a piece of stout iron pipe screwed at C into a flat base-piece, B, which is secured to the ground in any suitable manner—as, for instance, by means of downwardly-projecting points or by a single screw shaped like an auger, which can be bored into the ground. This attachment, however, forms no part of our invention, and may be of any character.

We mount upon the upright A a reel or drum, D, which we prefer to construct of cylindrical form, sheet-iron being a convenient material therefor. This reel has at top and bottom, respectively, heads F and E, which fit snugly, but so as to revolve freely, upon the upright A. Within the reel and coiled about the upright A is a spring, G, of suitable strength, one end of which is attached to the upright, the other to the reel, at suitable points. Above the head F we prefer to secure to the upright A a ratchet-wheel, H, with which the pawl I, fastened to the head F, engages in one direction. If desired, a stay-piece, K, may be attached to the upright A below the reel D, so as to give additional strength against the strain of the net.

J is the net, the construction of which is well understood, and which is attached at top and bottom to the reel D.

To operate the device the net is to be coiled or wound around the reel, as shown at Fig. 2, the reel, however, not being turned in such a way as to wind up the spring to any great extent. This of course can readily be effected by spreading out the net upon the ground and rolling the reel and its post upon it without turning the reel relatively to the post. The post, with the net thus wound upon its reel, is then screwed into the socket C of the base B, and the apparatus is ready for use. To set out the net it is taken by the upper free end and drawn away from the post in the desired direction. This uncoils the net from the reel D, and in so doing rotates the latter, winding up the spring G. By the time the net is fully uncoiled a very considerable tension thereon is thus produced, so that when the free end of the net is secured to the second post (which may be of any well-known construction, and therefore is not particularly described) the strain of the spring G will hold the net tightly in position between the two posts, and will prevent any tendency to sag. To effect this the pawl I is of course thrown out of engagement with the ratchet H. In order to again roll up the net, it is only necessary to detach what has been called the "free end" from the second post and walk toward the post A, holding the net at the proper height from the ground, when the spring G will cause the reel to rotate, and thus wind up the net thereon.

We have found it best to wind up the spring G to a slight extent by turning the reel with the net already upon it before commencing to unroll the latter, in order that when the winding-up process is complete there may still be some slight strain upon the spring. This not only facilitates the handling of the device in winding up the net, but the pawl I being brought into contact with the proper tooth of the ratchet-wheel H, the spring holds the reel firmly in position against accidental rotation.

It is obvious that the form of the apparatus may be greatly modified without affecting its mode of operation. Thus, for instance, instead of a cylindrical reel, which we prefer to use, a frame-work or skeleton reel can be used, and instead of a spring coiled about the upright A other spring devices may be substituted. The pawl and ratchet can be dispensed with, if desired, or other means for producing a similar result can be substituted therefor; hence we do not desire to limit our claim to the exact form of mechanism which is above specified.

We are aware that the use of a revolving reel and a spring actuated thereby is not, broadly speaking, new, such devices having been employed for winding up clothes-lines, curtains, &c., and we therefore do not desire to claim the same, except in the special application above described. The novelty of our present invention consists in the application of these devices to a lawn-tennis post, where the conditions of use require a constant though yielding strain upon the uncoiled net, so that the spring-reel performs the double office of a reel upon which to wind the net itself and a tension device to maintain it in position when in use, the tension being such as to accommodate itself not only to the shock of the ball, but to the more gradual changes effected by the weather.

Having thus described our invention, we claim—

The combination of a lawn-tennis post provided with suitable means for securing it to the ground, a reel revolving upon said post, and a spring connecting said reel and post and adapted to be wound up by the rotation of one upon the other, substantially as and for the purposes set forth.

CHARLES H. BRAITHWAITE.
  GEORGE LANE.
  WILLIAM HERRING.

Witnesses:
  CHARLES F. ZIEGLER,
  F. W. WEST.